(12) United States Patent
Tröger et al.

(10) Patent No.: US 6,594,981 B2
(45) Date of Patent: Jul. 22, 2003

(54) MOWING AND MULCHING SYSTEM FOR LAWNMOWERS

(75) Inventors: Hartmut Tröger, Asbach (DE); Alfred Tutschka, Mörsfelden-Wald (DE)

(73) Assignee: MWS Schneidwerkzeuge GmbH & Co. KG, Schmalkalden (DE)

( * ) Notice: Subject to any disclaimer, the term of this patent is extended or adjusted under 35 U.S.C. 154(b) by 0 days.

(21) Appl. No.: 09/940,068

(22) Filed: Aug. 27, 2001

(65) Prior Publication Data

US 2002/0073674 A1 Jun. 20, 2002

(30) Foreign Application Priority Data

Aug. 26, 2000 (DE) .......................... 100 42 086
Jul. 21, 2001 (DE) .......................... 101 35 656

(51) Int. Cl.$^7$ .......................... A01D 34/52; A01D 34/73
(52) U.S. Cl. .......................... 56/255; 56/295
(58) Field of Search .......................... 56/295, 255, 11.1

(56) References Cited

U.S. PATENT DOCUMENTS

| | | | | |
|---|---|---|---|---|
| 3,766,722 A | * | 10/1973 | Kamlukin et al. | 56/11.6 |
| 5,363,635 A | * | 11/1994 | White et al. | 56/255 |
| 5,442,902 A | * | 8/1995 | Mosley et al. | 56/17.5 |
| 5,609,011 A | * | 3/1997 | Kuhn et al. | 56/17.5 |
| 5,809,765 A | * | 9/1998 | Hastings et al. | 56/255 |
| 6,052,979 A | * | 4/2000 | Tutschka | 56/17.5 |
| 6,101,794 A | * | 8/2000 | Christopherson et al. | 280/124.179 |

FOREIGN PATENT DOCUMENTS

| | | |
|---|---|---|
| DE | 40 34 978 | 5/1992 |
| DE | 19 54 2860 | 5/1997 |
| DE | 19 52 8832 | 11/1998 |
| EP | 0 300 642 | 7/1988 |

* cited by examiner

Primary Examiner—Thomas B. Will
Assistant Examiner—Alicia Torres
(74) Attorney, Agent, or Firm—Collard & Roe, P.C.

(57) ABSTRACT

A mowing and mulching system for lawnmowers having multi-blade knives coupled to a motor-driven driving shaft and rotating in a pot-like cover opening at the bottom side. The blades are attached to a central hub part forming several cutting edge segments on the leading edge zones of the knife blades in the direction of rotation and repelling or bucket-like baffle elements on the trailing edge zones.

10 Claims, 4 Drawing Sheets

MOWING AND MULCHING SYSTEM FOR LAWNMOWERS

BACKGROUND OF THE INVENTION

1. Field of the Invention

The invention relates to a mowing and mulching system for lawnmowers having a sickle, with multi-blade knives on an engine-driven driving shaft. The blades rotate in a pot-like cover that is open on the bottom side, and adjoined by a central hub part.

2. Prior Art

Mowing and mulching systems for lawnmowers having a mulching effect by crushing the mowed material a number of times are well known.

For example, a lawnmower is shown in German Patent Application No. 4034978 A1. The knives viewed in the direction of rotation, have repelling elements on the longitudinal trailing edges at the ends of the blades of the knife. At the one end of the blade, these repelling elements project upwards beyond the plane of the knife, and downwards at the other end of the blade. These repelling elements can be produced by turning the edge of the back of the knife up, or by attaching material strips by welding. In addition to end disks that act as repelling elements, repelling elements serve as transport elements that transport the cut, mowed material several times into the range of action of the knife blades as the blades continuously revolve. This subjects the cut material to repeated crushing before the material drops into the pot-like cover, and is re-introduced into the soil.

However, with such a sickle-type mower, the desired mulching effect is inadequately obtained because the repelling elements are not capable of satisfying the purpose for which they are intended.

Therefore, European Patent Application No. EP 0 300 642 A1 and German Patent Application No. DE-PS 19 52 8832 are designed to solve the problem of complete crushing of the cut, mowed material, as well as mulching more efficiently by changing the shape of the knives, as shown in European Patent Application No. EP 0 300 642 A1 and German Patent Application No. DE-PS 19 52 8832 C2.

The mulching lawnmower proposed by German Patent Application No. DE 19 54 2860 A1, contains a mowing knife and two mulching knives arranged one on top of the other and rotate about a common axis of rotation, or in an opposite direction of rotation. A flow of air for promoting the mulching process is produced by the trailing edges of the knives and directed away from the plane of movement of the housing. This reference has not been capable of solving the problem of adequate, finely crushed mulching.

The knives proposed for sickle-type lawnmowers are expected to also produce, in combination with adequate mowing capacities, an efficient mulching of the cut, mowed material. The problem was designing the knife blades in an offset or stepped configuration, and to have these blades operate in several planes of rotation. The mowed material should also be lifted and possibly conveyed several times into the revolving knife blades depending on the degree of dryness or length of the grass. The result was that the mowed material is crushed a number of times. This is accomplished by providing wing-like guide surfaces mounted on the ends of the wings or knives set in a slanted manner.

The blades of the knives contain guide surfaces that are slanted with respect to the plane of rotation of the knife. Starting from the longitudinal leading edges of the knife blades, these blades extend in an ascending manner to the longitudinal trailing edges. Furthermore, the outer segment of the blades are contoured inward so that the segment is disposed below the plane of the hub part.

In addition, there are also repelling elements extending upwards and downwards at the ends of the blades in the direction of rotation behind the blades in the longitudinal direction of the knife. These repelling elements are attached perpendicular or inclined in relation to the plane of rotation of the knife. In addition, through different dimensioning of the active surfaces of these repelling elements effects of eddying are increased, and thus of multiple crushing of the mowed material.

Although it has been possible to make progress with these knives, the desired success has not been accomplished. The expected ejection of the cut material or its introduction into the soil of the mowed lawn still continues to be inadequate.

SUMMARY OF THE INVENTION

An object of the present invention is to provide a mowing and mulching system operating with lawnmowers that creates a finer mulching of the cut grass.

Another object is to provide a more completely operating mowing and mulching system that substantially improves the cutting capacity and the crushing of the mowed material to the finest degree. The system also ejects the mulched, almost pulverized cut grass in a targeted manner by pressing the latter into the grass sod and depositing it there.

The mowing and mulching system of the present invention operates as a combined system. The blades of the knives are arranged in a staggered manner next to each other and offset in relation to each other in the working direction. The blades are disposed in a common cutting plane. Thus, the outer segments of the cutting edges are disposed within the zone of the ends of the blades. Each edge is disposed below the plane of the hub part of the knife. The outer segment of the cutting edge is adjoined by a center cutting edge segment that is elevated beyond the plane of the hub part, and by an inner cutting edge segment that merges into the hub part and ends there. The ends of the blades of the knife, of which the longitudinal leading edges, viewed in the direction of rotation, are disposed below the plane of the hub part. These edges are in the form of baffle surfaces that are set slanted versus the plane of rotation of the knife. The baffle surfaces extend in an ascending manner, starting from the leading longitudinal edge to the longitudinal trailing edge, viewed in the direction of rotation.

This knife configuration is employed in a sickle-type lawnmower comprising a pot-like cover for receiving the knives. This cover is open at the bottom side and, viewed in the cutting direction, and comprises rear and side walls that reach up to below the plane of the outer segments of the blades.

The desired fine crushing process is accomplished, to obtain finely mulched, mowed material. The mowed material cut by the outer segments of the cutting edges of the knife blades and is repeatedly cut and crushed within the cover of the sickle-type lawnmower. For this purpose, the mowing gear having two or multi-bladed knives has a mulching mechanism that produces repeated cutting and crushing of the mowed material.

The mulching system is comprised of a dish-like turbo-disk fitted with baffle plates. The turbo-disk is disposed in the hub zone of the knife and secured on the driving shaft. The turbo-disk generates a turbo-effect so that the cut, mowed material is whirled around a number of times within the pot-like cover and seized several times by the knife blades and cut into small pieces. To create intensive whirling of the cut, mowed material within the cover, the system comprises a receiving dish. This receiving dish contains a plurality of baffle plates arranged in a radial manner or in the plane of a leading or trailing secant and projecting axially from the plane of the receiving dish. The received mowed material is continually whirled around by the baffle plates and repeatedly supplied in a crushing manner to the cutting planes of the knife, to be cut and crushed there again. A similar effect is obtained by the baffle surfaces or repelling elements arranged on the outer blade segments, which guide the mowed and mulched pieces of grass against the flow of the grass particles produced by the turbo-disk, so that further thorough mixing is achieved.

The baffle plates can be adjusted so that the mowed material such as the shape and size, are made available in different arrangements and forms of embodiments depending on whether the grass is, a leaf or stem type, or dry or moist.

Furthermore, a turbine designed like a type of bucket wheel creates an effective crushing and mulching. The turbine is arranged in the direction of motion of the lawnmower to the side of the staggered knife arrangement, preferably above the plane of rotation and cutting of said knives. The direction of rotation of the turbine corresponds with one of the knives, which are driven in the same direction of rotation.

The turbo-disks arranged on the axles of the individual knives may have different turbo-effects. The turbine generates turbulences within the pot-like cover for continuously whirling around the mowed material.

This system achieves a high degree of mulching of the mowed material along with good mowing capacity. This high degree of mulching is an important precondition to be satisfied for reintroducing the mowed material into the soil as green fertilizer.

The turbo-effect generated by the turbo-disks makes sure that the mulched material is pressed into the mowed surface of the lawn. The material does not have to be disposed of in some other way, as it is typically the case.

BRIEF DESCRIPTION OF THE DRAWINGS

Other objects and features of the present invention will become apparent from the following detailed description considered in connection with the accompanying drawing which discloses at least one embodiment of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
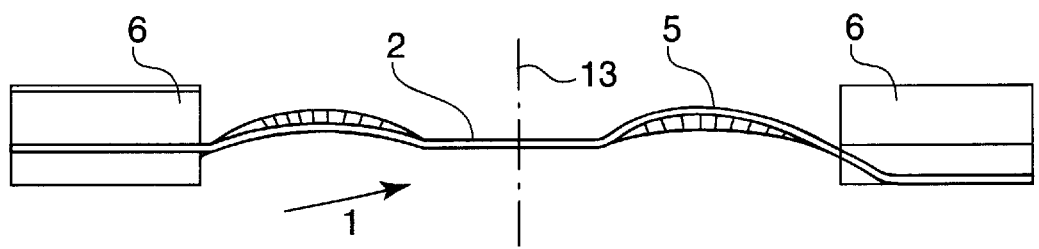
FIG. 1 shows a knife viewed from the aspect of the cutting plane, without the turbo-disk according to the present invention.
Figure 5:
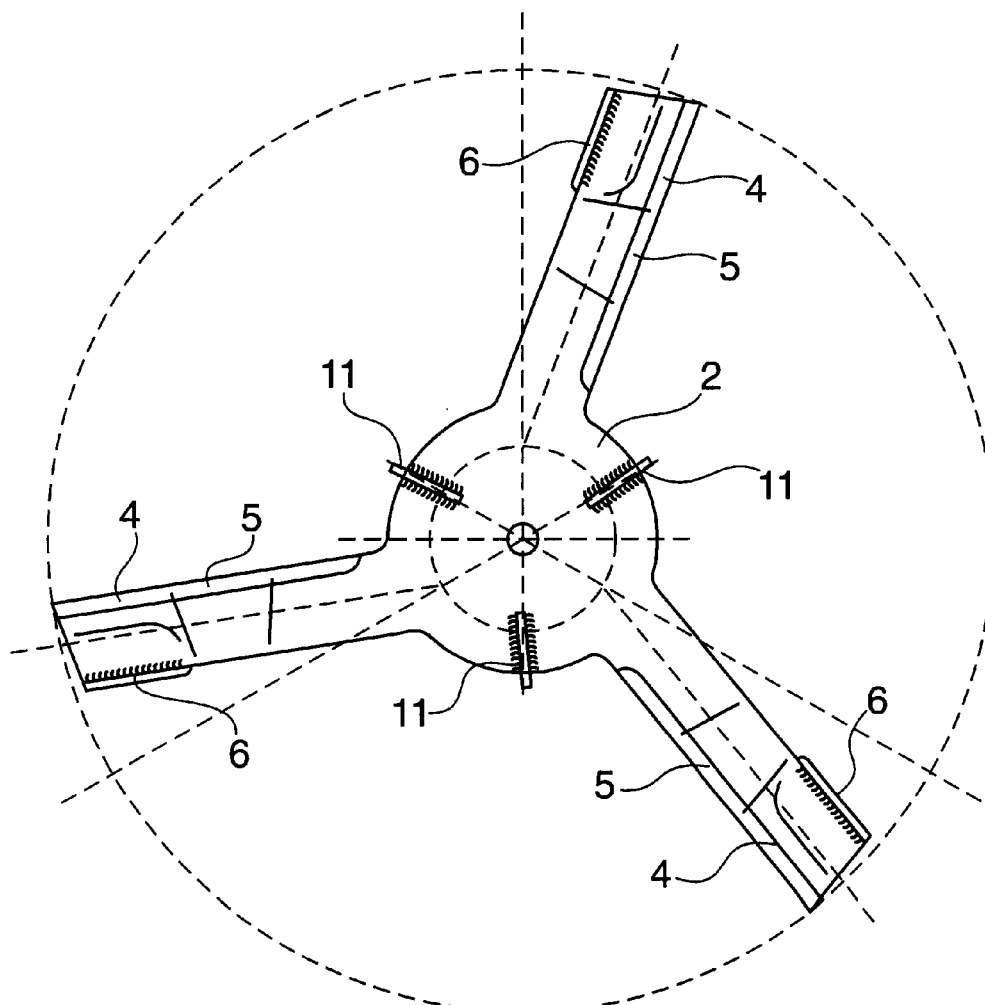
FIG. 5 shows a top view of a three-blade knife integrated with the receiving dish and the baffle plates in the hub part.

Knife 1 contains a center hub part 2 with a plurality of knife blades extending from hub part 2. The knife blades have straight cutting edges 4 extending along their longitudinal leading edges, and curved edge segments 5 extending toward hub part 2. Plate-like repelling elements 6, are mounted on the ends of the blades, as shown in FIGS. 1, 2 and 5.

With hub part 2, the knife is secured in the usual manner on driving shaft 7 of lawnmower 9, which has a cover 8.

Figure 2:
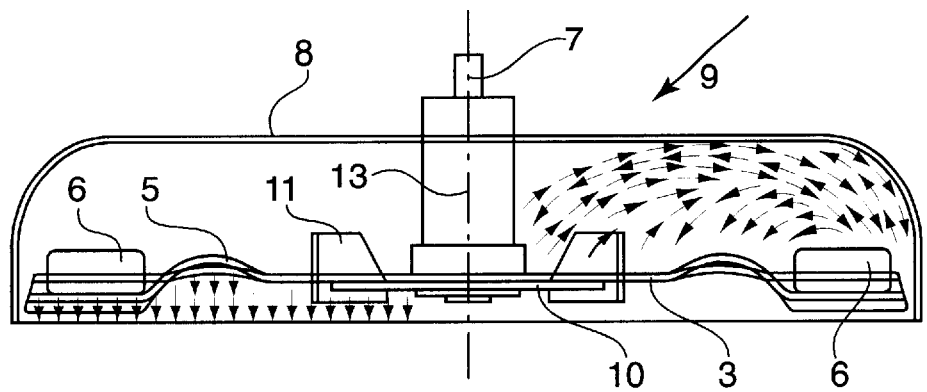
FIG. 2 shows a front view of a lawnmower with the mowing and mulching system arranged in the interior of the cover.
Figure 3:
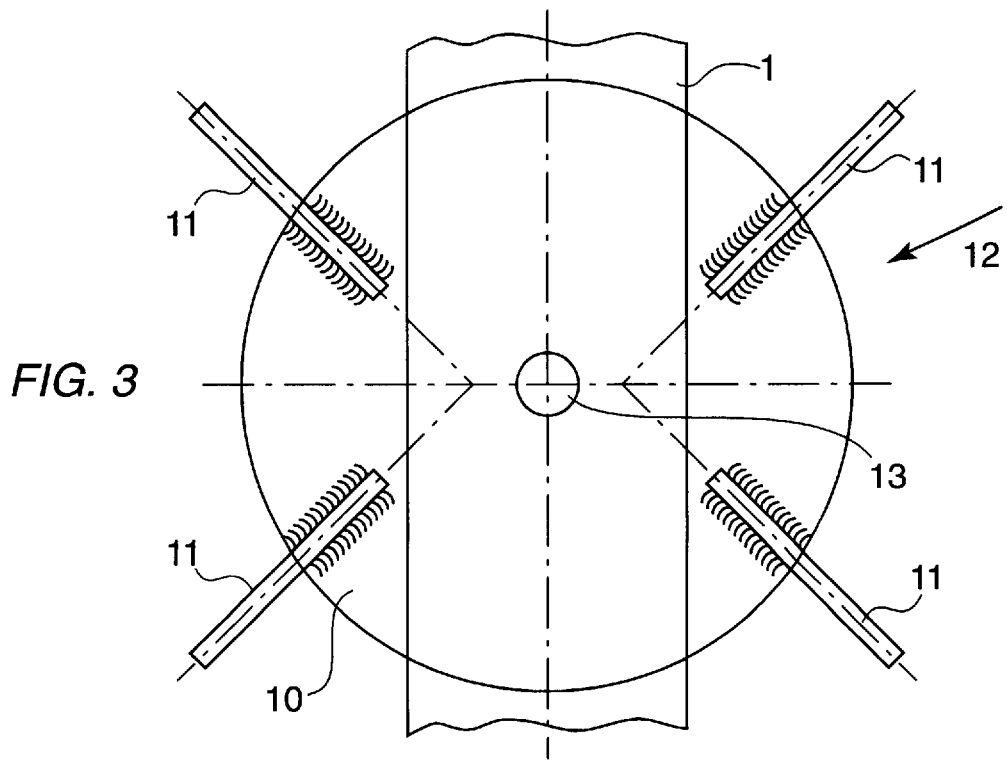
FIG. 3 shows a top view of a turbo-disk comprising a receiving dish and baffle plates with indicated knives.
Figure 4:
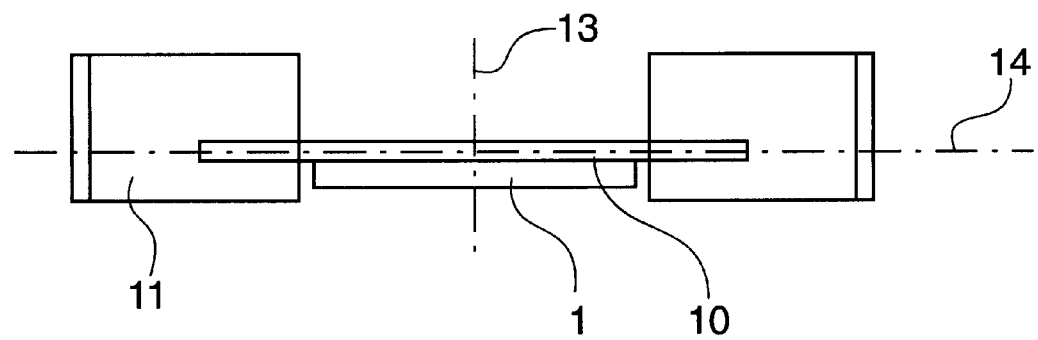
FIG. 4 shows a front view of the turbo-disk of FIG. 3, shown in its working plane.

As shown in FIG. 2, turbo-disk 12 comprises receiving dish 10 and baffle plates 11. FIGS. 3 and 4 show turbo-disk 12 disposed within the zone of hub part 2 and resting against knife 1. Jointly with knife 1, turbo-disk 12 forms a mowing and mulching system located within the lawnmower.

Baffle plates 11 are mounted on receiving dish 10 in a fixed manner, by welding. Baffle plates 11 may vary in number, shape and size in terms of surface area to be able to adjust or influence the turbo-effect in the interior of cover 8. This is required when cutting and mulching different grasses.

Figure 8:
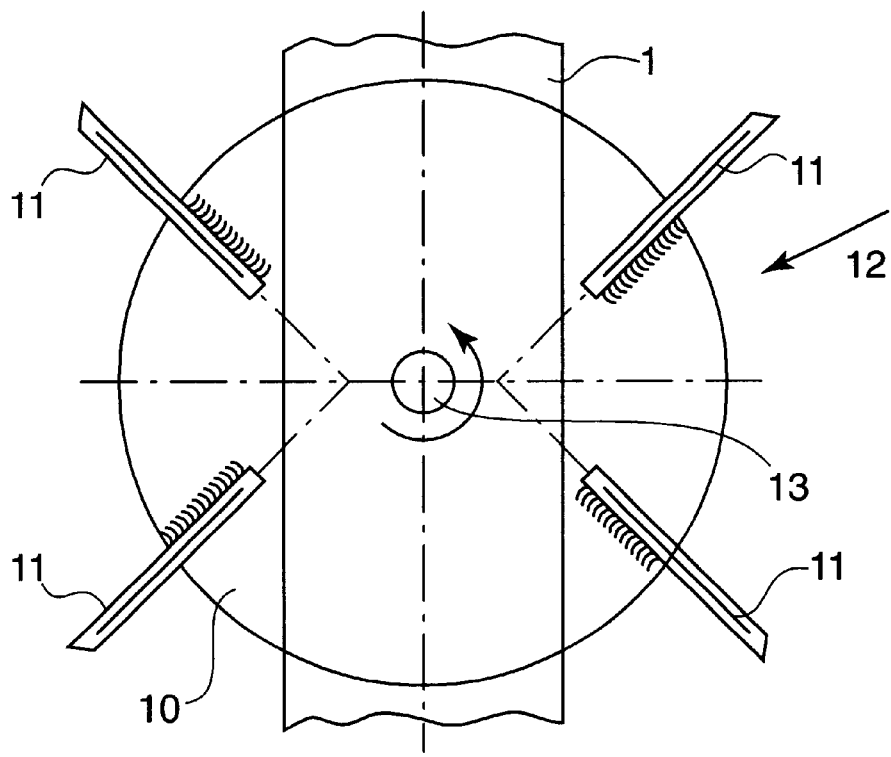
FIG. 8 shows the forward slanted baffle plates of the turbo disk.
Figure 9:
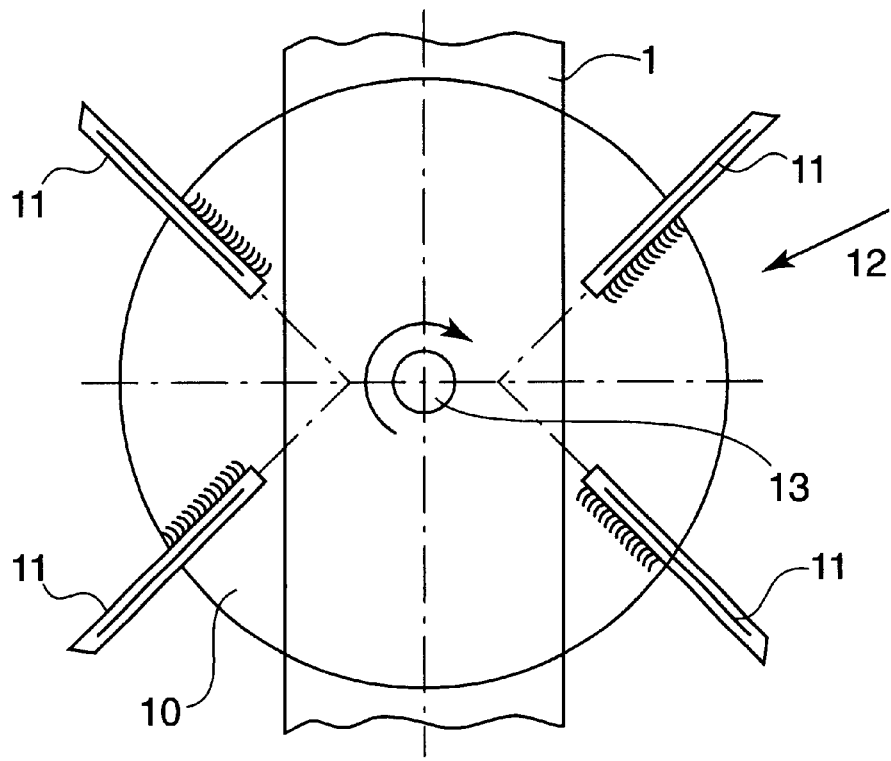
FIG. 9 shows the backward slanted baffle plates of the turbo disk.

Baffle plates 11 are set with different angles of adjustment based on the axis of rotation 13 of the mowing and mulching system. These baffle plates can be set in positions slanted in the forward or rearward direction based on the plane of rotation 14 of turbo-disk 12 as shown in FIGS. 8 and 9.

Baffle plates 11, repelling elements 6, and the special shape of the individual blade segments in the interior of cover 8, produce currents of air that are eddied within each other, as shown in FIG. 2. These currents of air form the turbo-effect that leads to effective mulching of the grass and its introduction into the soil.

Figure 6:
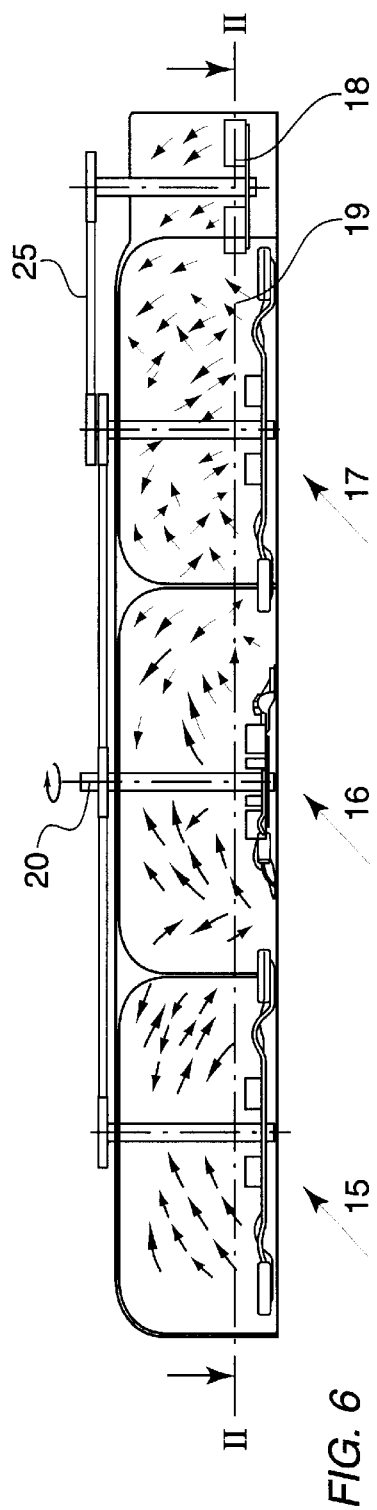
FIG. 6 shows a sectional front view of the mowing and mulching system along line I—I of FIG. 7.
Figure 7:
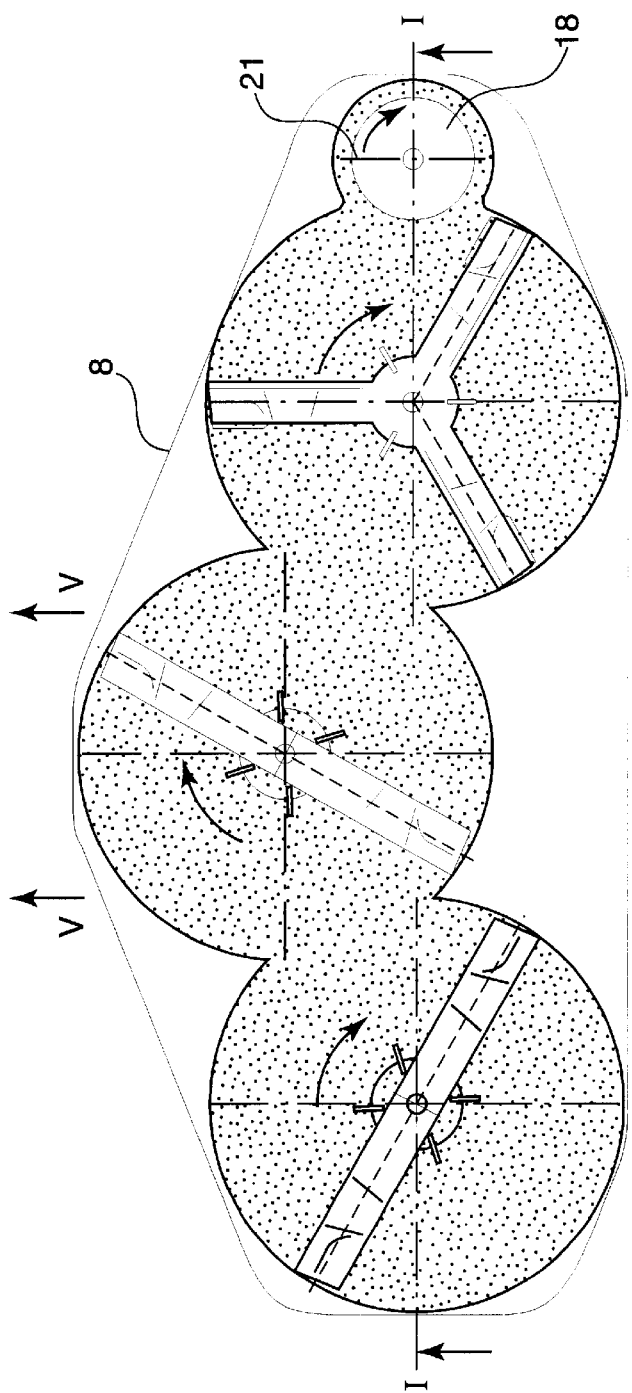
FIG. 7 shows a sectional top view of the mowing and mulching system according to FIG. 6 along line II—II in FIG. 6.

In another preferred embodiment, a plurality, preferably three of the mowing and mulching systems 15; 16; and 17 are disposed in the interior of cover 8. Turbine 18 is included with these systems for further completing the mulching process of the mowed material, as shown in FIGS. 6 and 7.

The mowing and mulching systems 15; 16; and 17 are arranged in rows next to each other in a staggered manner. When viewed in the cutting and advancing direction "V", the center mechanism of the three mowing and mulching mechanisms is placed ahead of the two laterally arranged mowing and mulching mechanisms.

Turbine 18 is arranged to the side of the staggered mowing and mulching mechanisms 15; 16; and 17, but in a plane 19 disposed above the plane of rotation 14 of turbodisk 12. Turbine 18 is driven via a central drive 20 and a linkage 25 at a higher speed, but at least with the same number of revolutions as knives 1. Turbine 18 with baffle plates 21 creates an additional turbulence in the interior of cover 8 between the mowed material and maintained in motion by knives 1 and turbo-disks 12. This turbulence continuously swirls the cut, mowed material up and forces the material again into the range of action of the knives and baffle plates, leading to further, almost total mulching of the mowed material.

Accordingly, while at least one embodiment of the present invention has been shown and described, it is to be understood that many changes and modifications may be made thereunto without departing from the spirit and scope of the invention as defined in the appended claims.

What is claimed is:

1. A mowing and mulching system for mowers comprising:
   a) a cover;
   b) a plurality of knives working as a sickle disposed within said cover, said knives comprising:
      i) a knife blade part having baffle surfaces set slanted vs. a plane of rotation of said plurality of knives;
      ii) a hub part;
      iii) a plurality of cutting edges extending from said knife blade part to said hub part, said cutting edges being contoured in a leading edge zone forming an outer cutting edge segment adjoined by a center blade segment which ascends beyond a plane of said hub part and descending into said plane of said hub part wherein said knife blade part has a trailing longitudinal edge that extends in or above said plane of said hub part;
   c) a driving shaft disposed within said cover;
   d) at least one turbo disk disposed adjacent to said hub part and coupled to said driving shaft above said plane of rotation of said plurality of knives, said turbo disk being in the form of a receiving dish and a plurality of baffle plates coupled to said receiving dish, wherein said turbo disk extends over said hub part towards said center cutting edge segment;
   e) a plurality of mowing and mulching mechanisms formed by said plurality of knives and said at least one turbo disk arranged adjacent to each other staggered with respect to a cutting advance of said mowing and mulching mechanism; and
   f) a turbine formed as a bucket wheel disposed inside said cover offset from and adjacent to said mowing and mulching mechanisms above a plane of said mowing and mulching mechanisms wherein said turbine rotates in a same direction of said mowing and mulching mechanisms.

2. The mowing and mulching system for lawnmowers according to claim 1, further comprising a central drive coupled to said hub part for driving said plurality of knives, wherein a driving revolution rate of said plurality of knives is adjustable.

3. The mowing and mulching system for lawnmowers according to claim 2, further comprising a linkage for creating a driving revolution rate of said turbine that is 20% greater than the number of revolutions of said plurality of knives.

4. The mowing and mulching system for lawnmowers according to claim 1, wherein said plurality of mulching mechanisms comprise at least one center mechanism arranged offset in a forward direction by half of a knife diameter.

5. The mowing and mulching system for lawnmowers according to claim 1, wherein said plurality of mowing and mulching mechanisms include a mowing and mulching mechanism that comprises three blades and is located closest to said turbine.

6. The mowing and mulching system for lawnmowers according to claim 1, wherein said at least one turbo-disk of said plurality of knives have different diameters and differently dimensioned heights.

7. The mowing and mulching system for lawnmowers according to claim 1, wherein said at least one turbo-disk comprises $\frac{1}{3}$ to $\frac{2}{3}$ of the height of said cover.

8. The mowing and mulching system for lawnmowers according to claim 1, wherein said baffle plates are arranged slanted forwards in relation to the plane of rotation of said at least one turbo-disk.

9. The mowing and mulching system for lawnmowers according to claim 1, wherein said baffle plates are slanted backwards in relation to the plane of rotation of the turbo-disks.

10. The mowing and mulching system for lawnmowers according to claim 1, wherein said baffle plates are arranged on said receiving dish with unequal successive spacings.

* * * * *